(12) United States Patent
Kalinowski et al.

(10) Patent No.: US 12,309,531 B2
(45) Date of Patent: May 20, 2025

(54) HEAD-MOUNTED DEVICES WITH FORWARD FACING CAMERAS (71) Applicant: Apple Inc., Cupertino, CA (US)

(72) Inventors: David A. Kalinowski, Davis, CA (US); Brian S. Lau, Seattle, WA (US)

( * ) Notice: Subject to any disclaimer, the term of this patent is extended or adjusted under 35 U.S.C. 154(b) by 0 days.

(21) Appl. No.: 18/439,607

(22) Filed: Feb. 12, 2024

(65) Prior Publication Data

US 2024/0187554 A1 Jun. 6, 2024

Related U.S. Application Data (63) Continuation of application No. 17/187,289, filed on Feb. 26, 2021, now Pat. No. 11,950,022.

(60) Provisional application No. 63/015,321, filed on Apr. 24, 2020.

(51) Int. Cl.
*H04N 7/18* (2006.01)
*G02B 27/01* (2006.01)
*G06V 40/19* (2022.01)
*H04N 23/90* (2023.01)

(52) U.S. Cl.
CPC ........... *H04N 7/18* (2013.01); *G02B 27/0172* (2013.01); *G02B 27/0176* (2013.01); *G06V 40/19* (2022.01); *H04N 23/90* (2023.01); *G02B 2027/0138* (2013.01)

(58) Field of Classification Search
None
See application file for complete search history.

(56) References Cited

U.S. PATENT DOCUMENTS

| | | | |
|---|---|---|---|
| 8,467,133 B2 | 6/2013 | Miller | |
| 9,459,451 B2 | 10/2016 | Saarikko et al. | |
| 9,494,799 B2 | 11/2016 | Robbins et al. | |
| 9,685,001 B2 | 6/2017 | Pasquero et al. | |
| 9,788,714 B2 | 10/2017 | Krueger | |
| 9,836,122 B2 | 12/2017 | Border | |
| 10,156,900 B2 | 12/2018 | Publicover et al. | |
| 10,203,762 B2 | 2/2019 | Bradski et al. | |
| 10,419,843 B1 | 9/2019 | Mehra et al. | |
| 10,747,009 B1* | 8/2020 | Sharma | G02B 5/26 |
| 11,067,809 B1* | 7/2021 | Sears | G02F 1/13475 |
| 2013/0194304 A1* | 8/2013 | Latta | G09G 3/003 |
| | | | 345/633 |
| 2015/0070470 A1* | 3/2015 | McMurrough | G06V 10/758 |
| | | | 348/78 |

(Continued)

*Primary Examiner* — Edemio Navas, Jr.
(74) *Attorney, Agent, or Firm* — Treyz Law Group, P.C.; G. Victor Treyz; David K. Cole (57) ABSTRACT A head-mounted device may have a head-mounted support structure with a left side portion, a right side portion, and a transparent front portion forming a lens. The lens may extend across the front of a user's face between the left and right side portions. The lens may have a mirror coating or other optical coating that helps obscure objects on the inner side of the lens when viewed from an exterior region surrounding the head-mounted device. Left and right forward-facing cameras with overlapping fields of view may be used to capture visible-light images through the lens. The cameras may also be used for gaze tracking. Left and right light sources may provide eye illumination that reflects from the lens into left and right eye boxes. Images from the eye boxes may reflect from the lens towards the left and right forward-facing cameras.

19 Claims, 4 Drawing Sheets (56)　　　　References Cited

U.S. PATENT DOCUMENTS

| | | |
|---|---|---|
| 2016/0381345 A1 | 12/2016 | Wu et al. |
| 2017/0006220 A1 | 1/2017 | Adsumilli et al. |
| 2017/0202633 A1 | 7/2017 | Liu |
| 2017/0332901 A1 | 11/2017 | Hwang et al. |
| 2017/0336641 A1* | 11/2017 | von und zu Liechtenstein ........... G06T 19/006 |
| 2018/0027676 A1 | 1/2018 | Araki et al. |
| 2019/0025588 A1 | 1/2019 | Osterhout et al. |
| 2019/0170647 A1* | 6/2019 | Ikenaga .............. A61B 1/00186 |
| 2019/0295271 A1* | 9/2019 | Xu ....................... G06V 40/169 |
| 2020/0333607 A1 | 10/2020 | Hatzilias et al. |
| 2021/0263307 A1 | 8/2021 | Rotariu et al. |

* cited by examiner

HEAD-MOUNTED DEVICES WITH FORWARD FACING CAMERAS

This application is a continuation of U.S. patent application Ser. No. 17/187,289, filed Feb. 26, 2021, which claims the benefit of provisional patent application No. 63/015,321, filed Apr. 24, 2020, which are hereby incorporated by reference herein in their entireties.

FIELD

This relates generally to electronic devices, and, more particularly, to electronic devices such as head-mounted devices.

BACKGROUND

Electronic devices such as head-mounted devices may have electrical components mounted in head-mounted support structures.

SUMMARY

A head-mounted device may have a head-mounted support structure. The support structure may have a left portion such as a left temple that runs along the left side of a user's head and a corresponding right portion such as a right temple that runs along the right side of the user's head. A transparent portion forming a lens may extend across the front of the user's face between the left and right side portions. The lens may overlap left and right eye boxes.

The lens may have a mirror coating, tint, or other optical properties that help obscure objects on the inner side of the lens when viewed from an exterior region surrounding the head-mounted device. Left and right forward-facing cameras with overlapping fields of view may be located on the inner side of the lens and may be used to capture visible-light images through the lens. The left and right forward-facing cameras may be obscured by the presence of the lens and may therefore be invisible or nearly invisible to external observers.

In addition to capturing images of the real-world, the cameras may also be used for gaze tracking. Left and right light sources may provide eye illumination that reflects from the lens into left and right eye boxes. Images from the eye boxes may reflect from the lens towards the left and right forward-facing cameras.

To help discriminate between eye images and ambient light signals, the left and right light sources may be modulated with an alternating-current modulation signal or other suitable modulation signal or an electrically adjustable shutter on the lens may be alternately placed in an open mode in which visible-light images may be gathered by the camera and a closed mode in which infrared eye images may be gathered.

DETAILED DESCRIPTION

A head-mounted device may have a head-mounted support structure that allows the head-mounted device to be worn on a user's head. Forward-facing cameras may be used to gather images of the user's surrounds. The head-mounted device may have gaze tracking components for monitoring a user's gaze. During operation, image processing techniques may be used to analyze captured images and information on the user's gaze. For example, image recognition operations may be used to identify real-world objects. Gaze tracking information may be used to determine which real-world objects are being observed by a user.

The head-mounted device may have side portions, sometimes referred to as arms or temples, that run alongside a user's head. The head-mounted device may also have a lens that extends between the temples. The lens forms the front of the head-mounted device and covers the user's eyes.

To enhance the appearance of the head-mounted device, electrical components for the head-mounted device may be hidden behind head-mounted support structures such as the temples and lens. In an illustrative embodiment, the head-mounted device has a left camera behind a left portion of the lens and a right camera behind a right portion of the lens. When performing gaze tracking functions, the cameras may gather images of the user's eyes from reflections off of the inner surface of the lens. The cameras may also serve as forward-facing scene cameras that operate through the lens.

Figure 1:
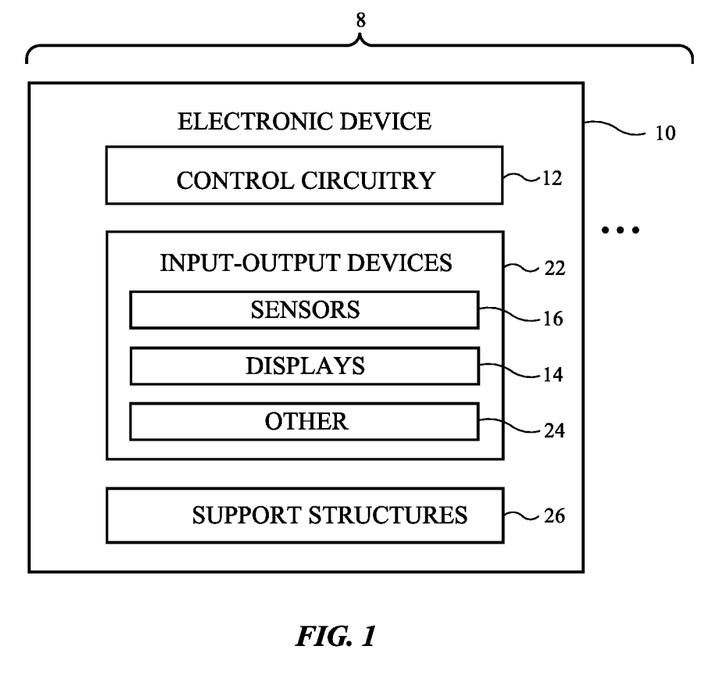
FIG. 1 is a schematic diagram of an illustrative electronic device such as a head-mounted display device in accordance with an embodiment.

A schematic diagram of an illustrative system that may include a head-mounted device is shown in FIG. 1. As shown in FIG. 1, system 8 may include one or more electronic devices such as electronic device 10. The electronic devices of system 8 may include computers, cellular telephones, head-mounted devices, wristwatch devices, and other electronic devices. Configurations in which electronic device 10 is a head-mounted device are sometimes described herein as an example.

As shown in FIG. 1, electronic devices such as electronic device 10 may have control circuitry 12. Control circuitry 12 may include storage and processing circuitry for controlling the operation of device 10. Circuitry 12 may include storage such as hard disk drive storage, nonvolatile memory (e.g., electrically-programmable-read-only memory configured to form a solid-state drive), volatile memory (e.g., static or dynamic random-access-memory), etc. Processing circuitry in control circuitry 12 may be based on one or more microprocessors, microcontrollers, digital signal processors, baseband processors, power management units, audio chips, graphics processing units, application specific integrated circuits, and other integrated circuits. Software code may be stored on storage in circuitry 12 and run on processing circuitry in circuitry 12 to implement control operations for device 10 (e.g., data gathering operations, operations involving the adjustment of the components of device 10 using control signals, etc.). Control circuitry 12 may include wired and wireless communications circuitry. For example, control circuitry 12 may include radio-frequency transceiver circuitry such as cellular telephone transceiver circuitry, wireless local area network transceiver circuitry (e.g., WiFi® circuitry), millimeter wave transceiver circuitry, and/or other wireless communications circuitry.

During operation, the communications circuitry of the devices in system 8 (e.g., the communications circuitry of control circuitry 12 of device 10), may be used to support communication between the electronic devices. For example, one electronic device may transmit video data, audio data, and/or other data to another electronic device in system 8. Electronic devices in system 8 may use wired and/or wireless communications circuitry to communicate through one or more communications networks (e.g., the internet, local area networks, etc.). The communications circuitry may be used to allow data to be received by device 10 from external equipment (e.g., a tethered computer, a portable device such as a handheld device or laptop computer, online computing equipment such as a remote server or other remote computing equipment, or other electrical equipment) and/or to provide data to external equipment.

Device 10 may include input-output devices 22. Input-output devices 22 may be used to allow a user to provide device 10 with user input. Input-output devices 22 may also be used to gather information on the environment in which device 10 is operating. Output components in devices 22 may allow device 10 to provide a user with output and may be used to communicate with external electrical equipment.

In some embodiments, input-output devices 22 may include one or more displays such as displays 14. In other embodiments, device 10 may be a displayless device that does not contain any displays.

In arrangements in which device 10 includes displays, device 10 may include left and right display devices. Device 10 may for example, include left and right display components such as left and right scanning mirror display devices or other image projectors, liquid-crystal-on-silicon display devices, digital mirror devices, or other reflective display devices, left and right display panels based on light-emitting diode pixel arrays such as organic light-emitting display panels or display devices based on pixel arrays formed from crystalline semiconductor light-emitting diode dies, liquid crystal display panels, and/or or other left and right display devices that provide images to left and right eye boxes for viewing by the user's left and right eyes, respectively.

Illustrative configurations in which device 10 does not contain any displays may sometimes be described herein as an example. In configurations in which device 10 does not contain displays, output may be provided to a user as audio output (e.g., output from speakers), haptic output (e.g., vibrations or other haptic output from haptic output devices), and/or other output devices. The user may supply input using touch sensors, force sensors (e.g., accelerometers that detect taps on a head-mounted support structure), buttons, gaze trackers (e.g., gaze tracking systems that measure a user's gaze), microphones (e.g., to supply voice commands), and/or other input devices. to a microphone in device 10 and a user may receive output using speakers, haptic output devices, and/or other output devices.

Input-output circuitry 22 may include sensors 16. Sensors 16 may include, for example, three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional lidar (light detection and ranging) sensors, three-dimensional radio-frequency sensors, or other sensors that gather three-dimensional image data), cameras (e.g., infrared and/or visible digital image sensors), gaze tracking sensors (e.g., a gaze tracking system based on an image sensor and, if desired, a light source that emits one or more beams of light that are tracked using the image sensor after reflecting from a user's eyes), touch sensors, capacitive proximity sensors, light-based (optical) proximity sensors, other proximity sensors, force sensors, sensors such as contact sensors based on switches, gas sensors, pressure sensors, moisture sensors, magnetic sensors, ambient light sensors, audio sensors (e.g., microphones for gathering voice commands and other audio input), sensors that are configured to gather information on motion, position, and/or orientation (e.g., accelerometers, gyroscopes, compasses, and/or inertial measurement units that include all of these sensors or a subset of one or two of these sensors), and/or other sensors.

User input and other information may be gathered using sensors and other input devices in input-output devices 22. If desired, input-output devices 22 may include other devices 24 such as haptic output devices (e.g., vibrating components), light-emitting diodes and other light sources, speakers such as ear speakers for producing audio output, circuits for receiving wireless power, circuits for transmitting power wirelessly to other devices, batteries and other energy storage devices (e.g., capacitors), joysticks, buttons, and/or other components.

Electronic device 10 may have housing structures (e.g., housing walls, straps, etc.), as shown by illustrative support structures 26 of FIG. 1. In configurations in which electronic device 10 is a head-mounted device (e.g., a pair of glasses, goggles, a helmet, a hat, etc.), support structures 26 may include head-mounted support structures (e.g., a helmet housing, head straps, temples in a pair of eyeglasses, goggle housing structures, and/or other head-mounted structures). The head-mounted support structures may be configured to be worn on a head of a user during operation of device 10 and may support displays 14, sensors 16, other components 24, other input-output devices 22, and control circuitry 12.

Figure 2:
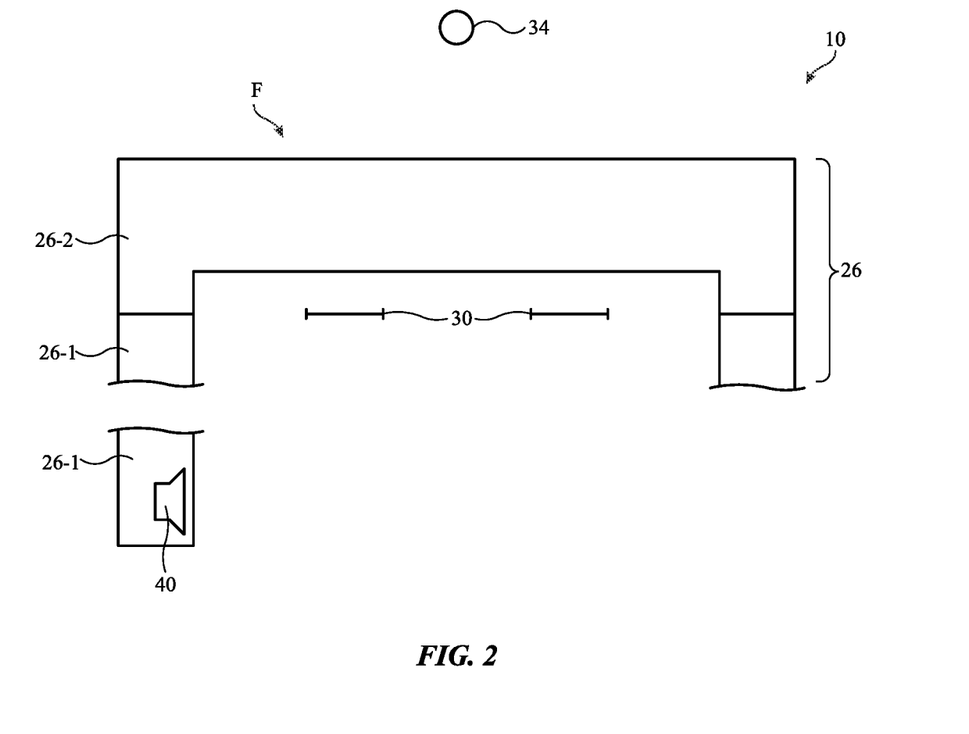
FIG. 2 is a top view of an illustrative head-mounted device in accordance with an embodiment.

FIG. 2 is a top view of electronic device 10 in an illustrative configuration in which electronic device 10 is a head-mounted device. As shown in FIG. 2, electronic device 10 may include head-mounted support structure 26 to house the components of device 10 and to support device 10 on a user's head. Support structure 26 may include, for example, structures that form housing walls and other structures at the front of device 10 (e.g., support structures 26-2, which may form frame structures such as a nose bridge, end pieces, and/or other housing structures) and additional structures such as straps, temples, or other supplemental support structures (e.g., support structures 26-1) that help to hold the main unit and the components in the main unit on a user's face so that the user's eyes are located within eye boxes 30.

During operation of device 10, head-mounted support structure 26 is worn on a user's head. In this configuration, the sides of head-mounted support structure 26 extend, respectively along the left and right sides of the user's head. Left and right speakers such as illustrative speaker 40 may be supported by structures 26-1 in ear-aligned locations (positions in which the speakers provide sound to adjacent ears of a user).

Portion 26-2 may include a lens. The lens may include one or more lens elements. For example, the lens may include a single layer of polymer, glass, or other transparent material that overlaps both the user's left eye and the user's right eye or the lens may include left and right lens elements that overlap the left and right eyes respectively and that are joined by a nose bridge. When the user's eyes are located in eye boxes 30, the user may view real-world objects such as object 34 through the lens. In configurations in which device 10 includes displays, optical combiner assemblies may be provided in housing portion 26-2 to direct images to eye boxes 30. These optical combiner assemblies may include optical couplers, waveguides, and/or other components. Configurations for device 10 that do not include optical combiner assemblies that supply images to eye boxes 30 may sometimes be described herein as an example.

Device 10 may have cameras. The cameras may capture image of the environment surrounding device 10 (sometimes referred to as real-world images or scene images). Images of the user's surroundings may be analyzed by control circuitry 12. For example, control circuitry 12 may include a database of known objects. During operation of device 10, scene images may be analyzed (e.g., using image recognition algorithms that access the database). This allows device 10 to identify objects in the user's surroundings. As an example, device 10 may recognize vehicles, buildings, electronic devices, and/or other real-world objects.

It may be desirable to provide a user with audio content and/or other content that is associated with the user's current environment. For example, a user may supply a voice command such as "where am I?" to device 10. In response, device 10 may use global positioning satellite information and/or other location information to determine the position of device 10. After determining the current location of device 10, device 10 may use speakers 40 to inform the user of the user's current location (e.g., by providing a synthesized voice response informing the user of the user's current geographic location).

If desired, user queries and other commands may be informed by the current direction of the user's gaze. For example, device 10 may contain gaze tracking components that monitor the user's eyes. The gaze tracking components may, for example, form gaze tracking systems for the user's left and right eyes. Using image data from the cameras in device 10 and using gaze tracing information, device 10 can determine which object is currently being viewed by the user. By analyzing the direction of the user's gaze, device 10 can therefore obtain context related to a user command. If, as an example, a user is viewing a particular building, device 10 when the user supplies device 10 with a query such as "what is that building?", device 10 can use both a) camera information and gaze tracking information that informs device 10 that the user is viewing building X and not building Y and b) the user's query (what is that building?) as inputs. In response to these inputs, device 10 can provide an appropriate response (e.g., an audio output such as a voice-synthesized response to the user's query such as "you are viewing building X").

Providing device 10 with the ability to analyze objects in the user's surroundings and to determine which object or objects a user is viewing may therefore involve the use of one or more cameras such as forward-facing cameras supported by structure 26 to capture scene images and using one or more gaze tracking sensors to track the direction of the user's view of the scene.

Figure 3:
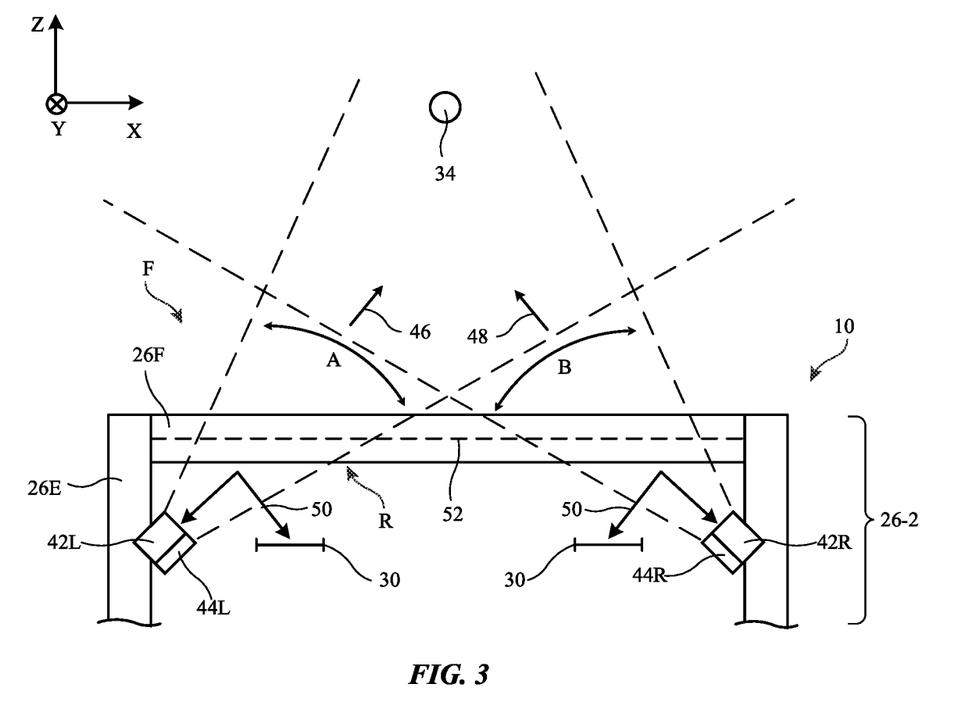
FIG. 3 is a top view of electrical components in an illustrative head-mounted device in accordance with an embodiment.

A top view of an illustrative electronic device of the type that may have scene imaging and gaze tracking capabilities is shown in FIG. 3. As shown in FIG. 3, head-mounted housing structures such as support structures 26-2 may include side portions at the sides of a user's face (e.g., left and right edge portions 26E) and may include a front portion such as front portion 26F that extends across the front of the user's face and thereby overlaps the user's left and right eyes located in eye boxes 30. Edge portions 26E may be integral portions of eye glass temples or other side portions of support structure 26 (sec, e.g., structures 26-1 of FIG. 2) and/or may be coupled to structures 26-1 (e.g., by hinges).

Some or all of forward-facing head-mounted support structures such as front portion 26F on front face F may form a lens. The lens may or may not exhibit a lens power. For example, the lens may be a planar or slightly curved layer of polymer and/or glass with parallel front and rear surfaces and may not exhibit any magnifying or demagnifying properties. Arrangements in which the lens (e.g., left and right portions of the lens in front of left and right eye boxes 30) form magnifying or demagnifying lens elements (e.g., to correct for vision defects such as far sightedness or near sightedness and/or astigmatism) may also be used (e.g., so that device 10 can serve as a pair of all-day glasses for a user having eyes that need vision correction).

One or more of the surfaces of the lens of front portion 26F may be provided with optical layers (e.g., a polarizer layer, coatings that exhibit partial mirror reflectivity, tint such as a non-neutral colored tin such as a yellow tint or a neutral tint such as a gray tint, wavelength-selective filtering such as ultraviolet light blocking, and/or other layers). In this way, the transmission, reflection, absorption, haze, polarization, and/or other properties of the lens may be configured to a desired fixed state. If desired, the lens of front portion 26F may be provided with adjustable components such as one or more electrically adjustable optical component layers (e.g., one or more layers such as adjustable layer 52). During operation of device 10, control circuitry 12 can control layer 52 to adjust the properties of layer 52. Layer 52 may include electrically adjustable components such as liquid crystal components, electrochromic components, and/or other electrically adjustable components that exhibit electrically adjustable amounts of haze, tint, reflection, absorption, transmission, polarization, and/or other optical properties across some or all of the visible light spectrum, infrared light spectrum, and/or ultraviolet light spectrum. Layer 52 may, as an example, serve as a shutter that operates in an open state (e.g. a state with a transmission of greater than 90% or other suitable value) and a closed state (e.g., a state with a transmission of less than 10% or other suitable value that is less than the transmission in the open state).

Adjustable layer 52 may be spatially addressable (e.g., layer 52 may have individually addressable pixels) or may be a pixelless layer that is adjusted by a global control signal. If desired, layer 52 may be omitted, layer 52 may be used in conjunction with one or more additional electrically adjustable layers, or layer 52 be used in conjunction with one or more fixed optical layers on the lens (e.g., a partial mirror coating on the front surface of the lens, a linear polarizer layer, circular polarizer layer, or other polarizer layer that provides device 10 with light polarization capabilities, a tint layer, etc.). Layer 52 and/or one or more layers of polymer, optical films, glass, etc. forming the lens of portion 26F may have a player shape (e.g., a sheet of material in the X-Y plane of FIG. 3), may have a shape with a slightly curved surface that extends substantially parallel to the X-Y plane, and/or may have convex and/or concave surfaces that provide the left and right portions of the lens of portion 26F with desired lens powers (e.g. to correct a user's vision defects).

To avoid creating unsightly structures on front face F of the lens of portion 26F, components such as cameras, gaze tracking system components, and/or other electrical and/or optical components in device 10 may be mounted adjacent to rear face R of the lens of portion 26F. Consider, as an example, the arrangement of FIG. 3 in which device 10 includes left camera 42L and right camera 42R facing rear face R of portion 26F. These cameras may view the user's surroundings through the lens of portion 26F, which is transparent. At the same time, a partial mirror coating on front face F, tinting (e.g. a neutral density tint formed on or in the lens), polarizer material, and/or other structures in the lens may partially or completely obscure cameras 42L and 42R from view from the exterior of device 10 (e.g., by a person in front of the user viewing the exterior of device 10).

Cameras 42L and 42R cameras may be forward facing (e.g., facing towards the +Z direction and not the −Z direction in the orientation of FIG. 3, so that scene images are captured in the outwards direction, which faces forward away from eye boxes 30). The fields of view of cameras 42L and 42R may overlap. For example, left camera 42L may be angled slightly to the right in direction 46 and right camera 42R may be angled in the opposite direction, slightly to the left, in direction 48. With this type of crossed field-of-view arrangement, left camera 42L captures scene images (e.g., images including real-world objects such as object 34) over a first range of angles (e.g., the field of view associated with angle A in FIG. 3, which includes areas to the front and right of device 10), whereas right camera 42R captures scene images over a second ranges of angles (e.g. the field of view associated with angle B in FIG. 3, which includes areas to the front and left of device 10). By combining image data from cameras 42L and 42R, control circuitry 12 can view objects in the user's surroundings and can identify such objects using image recognition techniques. Images may also be conveyed to remote equipment, may be recorded, may be displayed on external or internal displays, etc.

To provide device 10 with gaze tracking capabilities, device 10 may be provided with gaze tracking systems. The gaze tracking systems may include gaze tracking cameras that are separate from cameras 42L and 42R or cameras 42L and 42R may be configured to gather both real-world images (scene images of the outward scene surrounding device 10) and inwardly-directed eye images (images of eyes in eye boxes 30) for gaze tracking.

Consider, as an example, a scenario in which cameras 42L and 42R are used both as external scene cameras (with overlapping fields of view covering angles A and B in FIG. 3) and as gaze tracking cameras. To perform forward-facing camera functions, cameras 42L and 42R include visible-light-sensing pixels such as red, green, and blue pixels (e.g., pixels having photosensors covered respectively with red-pass filters, green-pass filters, and blue-pass filters). Gaze tracking functions can be performed at visible light wavelengths and/or infrared light wavelengths. For example, at visible and/or infrared light wavelengths, cameras 42L and 42R may capture images of the user's eyes in eye boxes 30. In capturing these eye box images, light from eye boxes 30 travels along optical paths 50, which include a reflection from front portion 26F (e.g., the lens of portion 26F). If desired, the lens of portion 26F may be provided with structures that facilitate reflection of image light from eye boxes 30 (e.g., gratings, holograms, thin-film interference filter reflectors, partial mirror coatings, adjustable components, etc.).

Cameras 42L and 42R may be provided with infrared light sensitivity by including infrared pixels in the image sensors of cameras 42L and 42R (e.g., pixels formed from photosensors covered with infrared-pass filters). The pixel filters (red, green, blue, and/or infrared) of cameras 42L and 42R may be formed from polymer filter elements (e.g., polymer or other material with dye and/or pigment), and/or thin-film interference filters (e.g., filters formed from dielectric stacks that pass desired wavelength bands).

To provide illumination for eyes in eye boxes 30, cameras 40L and 40R (e.g., gaze tracking systems that include cameras 40L and 40R) may be provided with light sources. For example, a gaze tracking system for the left eye box 30 of FIG. 3 may include camera 42L and left eye box light source 44L and a gaze tracking system for the right eye box 30 of FIG. 3 may include camera 42R and right eye box light source 44R. Light sources 44L and 44R may each include lasers, light-emitting diodes, and/or other light-emitting devices. There may be one or more light-emitting devices in each light source. As an example, light source 44L may contain one or more light-emitting diodes and light source 44R may contain one or more light-emitting diodes. These light-emitting diodes may operate at one or more visible light wavelengths and/or one or more infrared light wavelengths. The light emitted from light sources 44L and 44R may reflect from portion 26F (e.g., the lens in portion 26F) into eye boxes 30 along paths 50 to illuminate the user's eyes in eye boxes 30. The lens of portion 26F may include gratings, holograms, thin-film interference filter mirrors, and/or other structures that reflect light along paths 50 while allowing real-world visible light from real-world objects such as object 34 to pass through the lens to eye boxes 30.

Gaze tracking measurements may be made by capturing images of the user's pupils. The apparent shape of the user's pupils (e.g., the eccentricity of the pupil outlines) depends on the angle of the user's gaze, so by capturing images of the user's eyes and analyzing the shapes of the user's pupils, the direction of the user's gaze can be measured.

Another way in which the user's gaze may be measured by cameras 42L and 42R involves the use of an array of light-emitting diodes or other light-emitting devices in light sources 44L and 44R to create direct reflections (sometimes referred to as glints) from the surfaces of the user's eyes in eye boxes 30. The pattern of the glints changes as the direction of the user's gaze changes, so an image of the user's eyes in eye boxes 30 that contains glints can be analyzed to determine the user's gaze.

Pupil images and/or glints can be gathered at one or more visible light wavelengths and/or one or more infrared light wavelengths. In an illustrative configuration, light sources 44L and 44R emit infrared light, which is invisible (or nearly invisible) to the user, thereby allowing light sources 44L and 44R to emit light during operation of device 10 without distracting the user. The infrared light may, as an example, have a wavelength of at least 740 nm, at least 800 nm, at least 850 nm, at least 900 nm, 800-1000 nm, 800-950 nm, 900-1000 nm, less than 1500 nm, less than 1300 nm, or less than 1000 nm (as examples).

Infrared light from the environment (sometimes referred to as ambient infrared light or world infrared light) may potentially interfere with infrared light associated with infrared eye images (e.g., pupil images and/or glints illuminated using infrared light from light sources 44L and 44R). To discriminate between infrared eye image light and ambient infrared light, the light illuminated by light sources 44L and 44R may be modulated and/or the amount of ambient infrared light reaching cameras 42L and 42R may be modulated using an electrically adjustable shutter that overlaps the lens of portion 26F (see, e.g., electrically adjustable layer 52).

Figure 4:
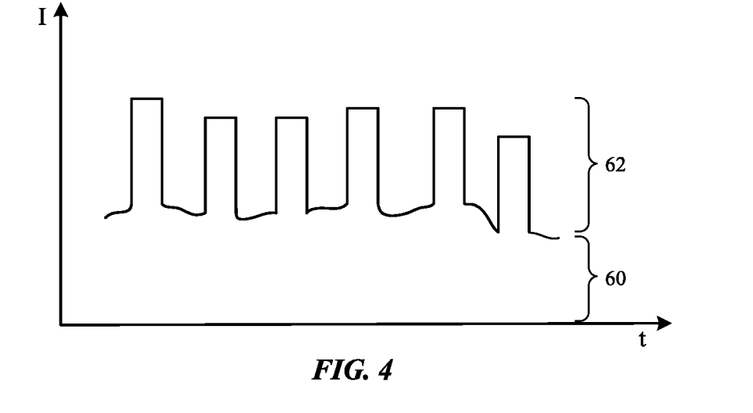
FIG. 4 is a graph showing how gaze tracking illumination may be modulated as a function of time in accordance with an embodiment.

In a first illustrative configuration, control circuitry 12 supplies a modulating control signal to light sources 44L and 44R. The modulating control signal may be a square wave, triangular wave, sine wave, or other modulating signal. In response, light sources 44L and 44R produce corresponding modulated output light intensities. For example, in a scenario in which control circuitry 12 supplies light sources 44L and 44R with a 1 kHz modulating alternating-current (AC) control signal, light sources 44L and 44R may produce infrared light with a corresponding 1 kHz modulated intensity. FIG. 4 is a graph showing how the incoming infrared light received at cameras 42L and 42R (e.g., the pixels of cameras 42L and 42R) in this type of scenario contains an unmodulated baseline portion 60, corresponding to unmodulated ambient infrared light and a modulated portion 62 corresponding to the modulated infrared light emitted by light sources 44L and 44R. In this illustrative configuration, cameras 42L and 42R may be event cameras or other camera systems whose infrared pixels can detect modulated light (e.g., by only reading changed pixels). The infrared pixels in cameras 42L and 42R may receive both modulated infrared light 62 from sources 44L and 44R and ambient infrared light portion 60 corresponding to infrared ambient light that reaches cameras 42L and 42R through the lens of portion 26F and through gaps between structure 26 and the head of the user (e.g., ambient light that passes to cameras 42L and 42R without passing through portion 26F). Cameras 42L and/or 42R and/or control circuitry 12 may analyze the image data from the pixels of cameras 42L and 42R to extract the modulated component of the infrared light from the unmodulated component of the infrared light. In this way, device 10 may discriminate between a) the detected infrared light that corresponds to images of the user's eyes such as images including pupil shape information and/or glint pattern information that serve as gaze tracking information and b) the detected ambient infrared light that originates from the user's surroundings and that does not correspond to eye box images. The eye box images may be used to track the user's gaze and the ambient light portion of the detected light may be ignored.

In a second illustrative configuration, control circuitry 12 supplies a control signal to an electrically adjustable shutter (e.g., adjustable layer 52). Adjustable layer 52 may be, for example, a liquid crystal shutter or other electrically adjustable shutter that exhibits open and closed states in response to control signals from control circuitry 12. In the open state, infrared ambient light (and visible light) may pass through the lens of portion 26F. This allows the user to view the real world through the lens of portion 26F and allows cameras 42L and 42R to capture images of the real world (e.g., object 34) through the lens of portion 26F. In the closed state, visible light and infrared light transmission through the lens of portion 26F is momentarily blocked (e.g., for an amount of time that is too short to be noticeable to the user), blocking ambient infrared light at cameras 42L and 42R and allowing cameras 42L and 42R to capture eye images from eye boxes 30 (e.g., infrared images containing gaze tracking information such as pupil images and/or glint pattern images as light sources 44L and 44R supply eye boxes 30 with infrared illumination).

Figure 5:
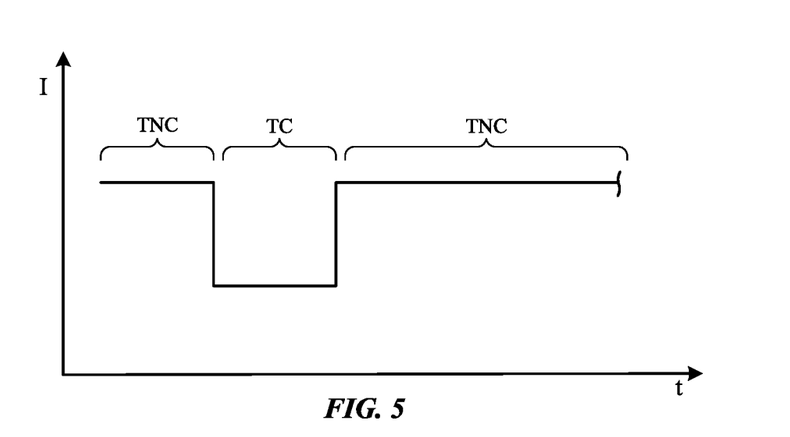
FIG. 5 is a graph showing how a shutter that blocks ambient light may be opened and closed as a function of time in accordance an embodiment.

FIG. 5 is a graph showing the light intensity (e.g., infrared light intensity) at cameras 42L and 42R that may be associated with this second illustrative configuration. During time periods TNC, when the adjustable shutter associated with the lens is open, the lens of device 10 is clear and the user may view the surrounding environment through the lens. In periods TNC, cameras 42L and 42R can capture images (e.g., visible light images) of the real world by viewing the real world through the lens. Periodically, the shutter may be momentarily closed, as illustrated by closed shutter time period TC of FIG. 5. The length of time period TC may be at least 1 microsecond, at least 1 ms, at least 10 ms, less than 100 ms, less than 20 m, less than 10 ms, or other suitable time period. The shutter may be opened and closed N times per second, where N is at least 1, at least 10, at least 100, less than 1000, less than 130, less than 70, or other suitable value. Whenever the shutter is closed, light from eye boxes 30 (e.g., infrared eye image light) may pass to cameras 42L and 42R along paths 50, reflecting from the lens of portion 42F. Because the shutter is closed during periods TC, infrared ambient light is blocked and does not pass through the lens of portion 26F to cameras 42L and 42R. As a result, infrared eye images can be captured by cameras 42L and 42R with reduced interference or no interference from infrared ambient light, as shown in the decrease in light intensity I of FIG. 5 during period TC relative to period TNC.

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: in contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality. Augmented reality: an augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof. Augmented virtuality: an augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: there are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/ earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, µLEDs, liquid crystal on silicon, laser scanning light sources, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The foregoing is merely illustrative and various modifications can be made to the described embodiments. The foregoing embodiments may be implemented individually or in any combination.

What is claimed is:

1. A head-mounted device, comprising:
a head-mounted support structure having left and right side portions coupled to a transparent front portion that overlaps left and right eye boxes;
a left camera located on the left side portion that is configured to gather eye tracking information from the left eye box using light reflected from the transparent front portion and to gather left images of real-world objects through the transparent front portion; and
a right camera located on the right side portion that is configured to gather eye tracking information from the right eye box in response to light reflected from the transparent front portion and to gather right images of real-world objects through the transparent front portion.

2. The head-mounted device of claim 1, wherein the left camera and the right camera are sensitive at visible and infrared wavelengths.

3. The head-mounted device of claim 2, wherein the left camera and the right camera are configured to gather the eye tracking information in response to infrared light reflected from the transparent front portion.

4. The head-mounted device of claim 3, wherein the left camera and the right camera are configured to gather the left images and the right images of the real-world objects in response to visible light that passes through the transparent front portion.

5. The head-mounted device of claim 4, further comprising:
an electrically adjustable shutter overlapping the transparent front portion that is configured to exhibit an open state and a closed state and wherein the left camera and the right camera are configured to gather gaze tracking information from the left and right eye boxes when the electrically adjustable shutter is in the closed state.

6. The head-mounted device of claim 5, wherein the left camera and the right camera are configured to gather the left images and the right images of the real-world objects when the electrically adjustable shutter is in the open state.

7. The head-mounted device of claim 2, wherein the left camera and the right camera are configured to receive infrared light contributions and visible light contributions, and the head-mounted device further comprises:
control circuitry that separates the infrared light contributions from the visible light contributions.

8. The head-mounted device of claim 1, further comprising:
light sources configured to illuminate the left and right eye boxes with infrared light, wherein the left camera and the right camera are configured to gather the eye tracking information in response to the infrared light that reflects from the transparent front portion.

9. The head-mounted device of claim 8, wherein the light sources are configured to illuminate the left and right eye boxes with modulated light having an intensity modulated as a function of time, wherein the left camera and the right camera are configured to detect the modulated light.

10. The head-mounted device of claim 1, wherein the left side portion has a left speaker in a left ear-aligned location, the right side portion has a right speaker in a right ear aligned location, and the left camera and the right camera are configured to gather images from the left and right eye boxes, respectively.

11. A head-mounted device, comprising:
   a head-mounted housing having left and right side portions coupled to a transparent front portion that overlaps left and right eye boxes;
   a left camera located on the left side portion, wherein the left camera comprises first pixels that are configured to capture a first image that includes first infrared-light image data and first visible-light image data through the transparent front portion and to capture a first infrared image from the left eye box;
   a right camera located on the right side portion, wherein the right camera comprises second pixels that are configured to capture a second image that includes second infrared-light image data and second visible-light image data through the transparent front portion and to capture a second infrared image from the right eye box; and
   control circuitry that is configured to separate the first and second visible-light image data from the first and second infrared-light image data.

12. The head-mounted device of claim 11, further comprising:
   light sources configured to illuminate the left and right eye boxes with infrared light, wherein the left camera and the right camera are configured to gather the first and second infrared images from the infrared light that has reflected from the left and right eye boxes.

13. The head-mounted device of claim 12, wherein the light sources are configured to illuminate the left and right eye boxes with modulated light having an intensity modulated as a function of time, wherein the left camera and the right camera are configured to detect the modulated light.

14. The head-mounted device of claim 13, wherein the control circuitry is configured to separate the first and second visible-light image data from the first and second infrared-light image data by separating the modulated light from unmodulated visible light.

15. The head-mounted device of claim 14, wherein the left camera and the right camera are configured to gather the first and second infrared images from the infrared light that has reflected from the left and right eye boxes and from the transparent front portion.

16. A head-mounted device, comprising:
   a head-mounted support structure having a transparent front portion that overlaps left and right eye boxes;
   a shutter that overlaps the transparent front portion, wherein the shutter is adjustable between an open state and a closed state; and
   cameras coupled to the head-mounted support structure, wherein each of the cameras is configured to gather visible light images of real-world objects when the shutter is in the open state and is configured to gather infrared gaze tracking information from the left and right eye boxes when the shutter is in the closed state.

17. The head-mounted device of claim 16, further comprising infrared light sources configured to illuminate the left and right eye boxes.

18. The head-mounted device of claim 17, wherein the cameras are configured to gather the infrared gaze tracking information from infrared light emitted from the infrared light sources that has reflected off of the transparent front portion.

19. The head-mounted device of claim 18, wherein the shutter comprises a liquid crystal shutter having a visible light transmission of at least 90% in the open state and of less than 10% in the closed state.

* * * * *